US010023821B2

(12) United States Patent
Lee et al.

(10) Patent No.: US 10,023,821 B2
(45) Date of Patent: Jul. 17, 2018

(54) METHOD AND APPARATUS FOR IMPROVING HEAT TRANSFER AND REACTION EFFICIENCY OF GAS HYDRATE REACTOR USING SCRAPER

(71) Applicants: Korea Institute of Industrial Technology, Cheonan-si (KR); Korea Gas Corporation, Seongnam-si (KR); Daewoo Engineering & Construction Co., Ltd., Seoul (KR); STX Offshore & Shipbuilding Co., Ltd., Changwon-si (KR); Sungilturbine Co., Ltd., Busan (KR); Dongshin Hydraulics Co., Ltd., Busan (KR)

(72) Inventors: Ju Dong Lee, Busan (KR); Kyung Chan Kang, Daegu (KR); Sang Yeon Hong, Ulsan (KR); Jae Il Lim, Daegu (KR); Sang Yup Jang, Ansan-si (KR); Seung Beom Hong, Seoul (KR); Ho Kyeong Kim, Changwon-si (KR); Ta Kwan Woo, Busan (KR); Sang Min Kim, Busan (KR)

(73) Assignees: KOREA INSTITUTE OF INDUSTRIAL TECHNOLOGY, Cheonan-si (KR); KOREA GAS CORPORATION, Seongnam-si (KR); DAEWOO ENGINEERING & CONSTRUCTION CO., LTD., Seoul (KR); STX OFFSHORE & SHIPBUILDING CO., LTD., Changwon-si (KR); SUNGILTURBINE CO., LTD., Busan (KR); DONGSHIN HYDRAULICS CO., LTD., Busan (KR)

( * ) Notice: Subject to any disclaimer, the term of this patent is extended or adjusted under 35 U.S.C. 154(b) by 945 days.

(21) Appl. No.: 14/345,501

(22) PCT Filed: Sep. 19, 2012

(86) PCT No.: PCT/KR2012/007501
§ 371 (c)(1),
(2) Date: Mar. 18, 2014

(87) PCT Pub. No.: WO2013/042940
PCT Pub. Date: Mar. 28, 2013

(65) Prior Publication Data
US 2014/0330055 A1 Nov. 6, 2014

(30) Foreign Application Priority Data
Sep. 19, 2011 (KR) .................. 10-2011-0094310

(51) Int. Cl.
C10L 3/10 (2006.01)
B01J 10/00 (2006.01)
(Continued)

(52) U.S. Cl.
CPC .......... *C10L 3/108* (2013.01); *B01F 7/00158* (2013.01); *B01F 7/00166* (2013.01);
(Continued)

(58) Field of Classification Search
CPC ..................................................... C10L 3/108
(Continued)

(56) References Cited

U.S. PATENT DOCUMENTS 2,298,317 A * 10/1942 Smith ................ B01D 19/0052
165/168
4,100,615 A * 7/1978 Thompson ............. B01F 7/162
366/170.2
(Continued)

FOREIGN PATENT DOCUMENTS

CH 353724 A * 4/1961 ............. B01F 7/166
DE 9420292 U1 * 4/1996 .......... B01F 7/00208
(Continued)

OTHER PUBLICATIONS

Machine translation of JP 2001-010990 A (Jan. 2001).*
(Continued)

*Primary Examiner* — Jennifer A Leung
(74) *Attorney, Agent, or Firm* — Brian C. Trinque; Lathrop Gage LLP

(57) ABSTRACT

The present invention relates to an apparatus comprising a reactor body to which gas and water are supplied to create a gas hydrate; an upper cover which is engaged to an upper portion of the reactor body, a scraper mounted rotationally within the reactor body, and a motor for providing a driving force to the scraper. It is possible to remove gas hydrate
(Continued)

particles attached to at least one of an inner surface of the reactor body and an inner surface of the upper cover, by a rotary driving of the scraper. According to the invention, it is possible to prevent a material hindering a heat transfer by attaching on a wall surface of the reactor, through a process of scraping out gas hydrate particles, when the scraper which is rotationally driven about a center axis of the reactor is close to the inner surface of the reactor.

1 Claim, 6 Drawing Sheets

(51) Int. Cl.
B01F 7/00 (2006.01)
B01F 7/16 (2006.01)
B01J 19/00 (2006.01)
B01J 19/18 (2006.01)
B01J 4/00 (2006.01)

(52) U.S. Cl.
CPC ...... *B01F 7/00175* (2013.01); *B01F 7/00208* (2013.01); *B01F 7/166* (2013.01); *B01J 4/004* (2013.01); *B01J 10/00* (2013.01); *B01J 19/0066* (2013.01); *B01J 19/18* (2013.01); *B01J 2219/00094* (2013.01)

(58) Field of Classification Search
USPC .......................................................... 585/15
See application file for complete search history.

(56) References Cited

U.S. PATENT DOCUMENTS

| 4,854,720 | A | * | 8/1989 | Schold | ................. B01F 3/1221 366/294 |
| 2009/0050525 | A1 | | 2/2009 | Sappok et al. | |
| 2009/0235586 | A1 | * | 9/2009 | Katoh | ..................... C10L 3/108 48/127.9 |
| 2011/0064643 | A1 | | 3/2011 | Lee et al. | |

FOREIGN PATENT DOCUMENTS

| EP | 0328975 | A2 | * | 8/1989 | .......... B01F 7/00208 |
| EP | 0335096 | A2 | * | 10/1989 | .......... B01F 7/00208 |
| FR | 2422437 | A1 | * | 11/1979 | .......... B01F 7/00208 |
| GB | 496420 | A | * | 11/1938 | .......... B01F 7/00391 |
| GB | 890355 | A | * | 2/1962 | ............... A21C 1/02 |
| GB | 1209046 | A | * | 10/1970 | .............. B01F 7/183 |
| JP | 2001010990 | A | * | 1/2001 | |
| JP | 4488769 | B2 | | 4/2010 | |
| JP | 2011-062685 | A | | 3/2011 | |
| WO | 1996/002563 | A1 | | 2/1996 | |

OTHER PUBLICATIONS

Machine translation for CH 353724 A (Apr. 1961).*
Machine translation for DE 9420292 U1 (Apr. 1996).*
Machine translation for EP 0335096 A2 (Oct. 1989).*
International Search Report with Written Opinion corresponding to International Patent Application No. PCT/KR2012/007501, dated Mar. 13, 2013.

* cited by examiner

[Fig. 1]
PRIOR ART

[Fig. 6]
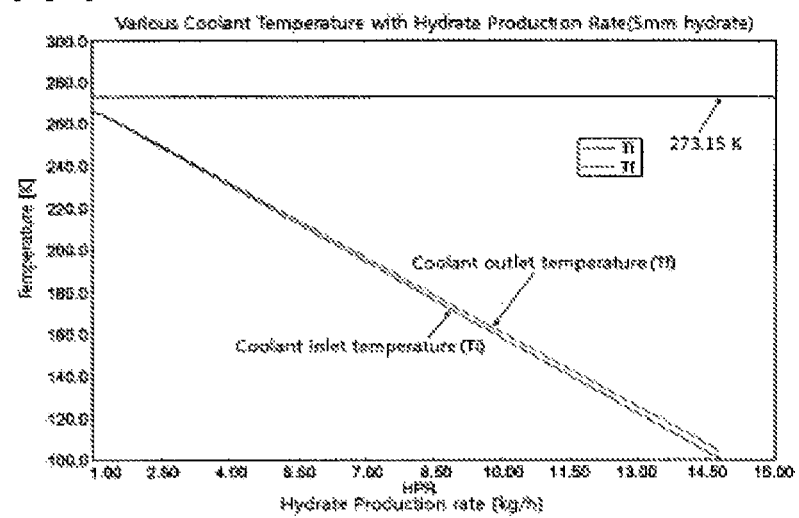
[Fig. 7]
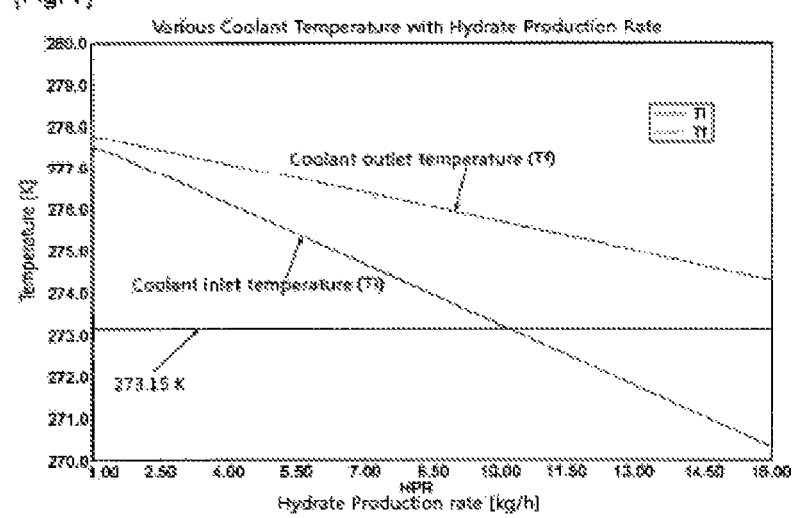

METHOD AND APPARATUS FOR IMPROVING HEAT TRANSFER AND REACTION EFFICIENCY OF GAS HYDRATE REACTOR USING SCRAPER

RELATED APPLICATIONS

This application is a 35 U.S.C. § 371 filing of International Application No. PCT/KR2012/007501, filed Sep. 19, 2012, which claims priority to Korean Patent Application No. 10-2011-0094310, filed on Sep. 19, 2011, each of which is incorporated herein by reference in its entirety.

TECHNICAL FIELD

Exemplary embodiments of the present invention relate to generally a gas hydrate reactor, and more specifically to a gas hydrate reactor having a scraper, capable of removing gas hydrate particles, which is attached on an inner wall of the reactor in which a reaction between water and gas is implemented, by a process which is rotationally driven about a center axis of the reactor.

BACKGROUND ART

In general, a clathrate hydrate means crystalline compounds that guest molecules are physically trapped inside a three dimensional lattice structure formed by a hydrogen bond of host molecules, without chemical bonds. Also, a gas hydrate means that host molecules are water molecules and guest molecules are low molecular gas molecules such as methane, ethane, propane, or carbon dioxide.

The clathrate hydrates were first discovered in 1810 by Sir Humphry Davy of England. In a Baker Lecture targeting the Royal Society, he announced that when chlorine is reacted with water, a compound similar to ice is formed, but its temperature is higher than 0° C. Also, the fact that the gas hydrate is produced when one chlorine molecule is reacted with ten water molecules, was first discovered in 1823 by Michael Faraday.

Thereafter, until now, researchers continue to study this gas hydrate as one of phase change materials, in which their principal research fields include a phase equilibrium and generation/dissociation condition, crystal structure, coexistence phenomena of polycrystal, competitive change of composition in a cavity, etc. In addition, detailed researches are still progressing at various macroscopic and microscopic views.

Of the guest molecules which are able to be trapped in the gas hydrate, 130 kinds of guest molecules or more are known so far, for example, $CH_4$, $C_2H_6$, $C_3H_8$, $CO_2$, $H_2$, $SF_6$, etc. Also, gas hydrate crystal structures, which are constructed by a polyhedron-shaped cavity formed by water molecules having a hydrogen bond and based upon a formation condition and a kind of gas molecule, have the following crystal structures: a body-centered cubic structure I, sI; a diamond cubic structure II, sII; and a hexagonal structure H, sH. The sI and sII are determined by the size of the guest molecule, and in the sH, the size and the shape of the guest molecule function are important factors.

The guest molecule of gas hydrate is trapped in deposits of methane on the deep ocean floor or frozen soil, and such methane is in the spotlight as a clean energy source because a small quantity of $CO_2$ is created during its combustion. More specifically, the gas hydrate can be used as an energy source possible to substitute the existing fossil fuels, and may be used to facilitate the solid storage and transportation of natural gas by utilizing the hydrate structure, or for isolation/storage of $CO_2$ to combat global warming. Also, it may be used for an apparatus for separating gas or aqueous solution from it, such as, in particular, a seawater desalination apparatus.

The gas hydrates are mainly found in petroleum or natural gas reservoirs, an area adjacent to a coal bed, or a sedimentary layer in deep-ocean having a condition of a low temperature and a high atmospheric pressure such as, in particular, a continental slope.

Also, the gas hydrates may be artificially produced and generally have a shape as shown in FIG. 1.

FIG. 1 illustrates a typical gas hydrate producing apparatus 10 as described in a prior art.

The typical gas hydrate producing apparatus 10 described in the prior art includes a water supplying portion 1, a gas supplying portion 2, a reactor 3 in which water from the water supplying portion 1 is reacted with the gas supplying portion 2, an ejector 4 for ejecting to the outside of the gas hydrate generated by the reactor, and a stirring apparatus 5 to increase the reaction rate between water and gas. To establish an environment within the reactor 3 to have an appropriate temperature condition while producing the gas hydrate, a separate cooling jacket 6 may be provided to surround the outside of the reactor 3. The cooling jacket 6 is connected to a refrigerant supplying portion 7 so that a refrigerant can be continuously supplied.

The reactor 3 for forming the gas hydrate has a cylindrical shape and is equipped with the stirring apparatus 5 having a stirrer or screw type for stirring altogether the water and the gas supplied into the inside of an apparatus for enhancing a reaction efficiency and an efficiency for elimination of heat of reaction. In the stirring apparatus 5 having such a cylindrical shape, the gas hydrate is essentially created, regardless of phases of supplied water and gas or a supplying method and type, and the generated gas hydrate is easily attached on the wall surface of the inside of the reactor 3 having a cylindrical shape. Once the gas hydrate is attached, it has a characteristic that it continues to grow by performing a role of nuclear seed by itself.

Due to such characteristics, since a kind of film or wall is formed on the wall surface of the inside of the reactor 3 after the lapse of time, it hinders a flow of fluid inside the reactor 3 and functions as a heat transfer wall. In particular, since a thermal conductivity of the gas hydrate is lower than that of ice, it leads to a strong insulation effect by hindering a thermal flow through the wall surface of the reactor 3. As a result, the reaction efficiency to the outside of the reactor 3 is remarkably reduced, which negatively affects the cost efficiency of a heat exchange. Preferably, in the reactor, it is necessary to quickly remove the heat of reaction outwardly.

Also, attempts have been made throughout the years to prevent forming of the gas hydrate on the wall surface of the inside of the reactor 3, for example, by utilizing a process of generating a strong disturbance inside the reactor 3 or a process of coating a thin hydrophobic film on the inner wall surface of the reactor, etc.

However, conventional solutions have not been able to effectively control an attachment and a growth of the gas hydrate on the wall surface of the inside of the reactor.

DISCLOSURE OF INVENTION

Technical Problem

A general object of the present invention is to provide a gas hydrate reactor having a scraper which is rotationally driven within a cylinder-shaped reactor, by which it is possible to remove gas hydrate particles attached on the wall surface of the inside of the reactor.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Solution to Problem

In accordance with an embodiment of the present invention, a reactor comprises a reactor body to which gas and water are supplied to create a gas hydrate, an upper cover which is engaged to an upper portion of the reactor body, a scraper which is rotationally mounted within the reactor body, and a motor for providing a driving force to the scraper, wherein the gas hydrate particles attachable on at least one of the inner surface of the reactor body or an inner surface of the upper cover, can be removed by a rotating driving of the scraper, and the scraper has a stirring function.

In accordance with another embodiment of the present invention, the scraper may include a rotating axis disposed on a center axis of the reactor body, a first scraper for scraping an inner surface of the reactor body in such a manner that it is connected to the rotating axis, and a second scraper for scraping an inner surface of the upper cover body in such a manner it is connected to an upper portion of the rotating axis.

In accordance with another embodiment of the present invention, the first and second scrapers may include a connecting bar extending from the rotating axis, and a blade disposed on the end of the connecting bar, respectively, wherein the blades have a predetermined curvature for corresponding to the reactor body and an inner surface of the upper cover.

In accordance with another embodiment of the present invention, the apparatus further comprises an stirring apparatus to be driven under a condition with the same center of rotation as the scraper, wherein the stirring apparatus is actuated at a speed different with a rotating speed of scraper by a speed reducer arranged to surround the rotating axis.

In accordance with another embodiment of the present invention, the apparatus further comprises a propeller structure arranged on a lower portion of the reactor body, and a propeller driving motor for providing a driving force to the propeller structure.

In accordance with another embodiment of the present invention, the apparatus further comprises a slurry outlet which is connected and disposed to the upper cover.

In accordance with an embodiment of the present invention, a method comprising supplying gas and water to a reactor body in which gas hydrates are created, applying a driving force to a scraper arranged rotationally within the reactor body by using a scraper driving motor, and removing gas hydrate particles attached to at least one of the inner surface of the reactor body or the inner surface of an upper cover engaged to the reactor body, by a rotational driving of the scraper, wherein the scraper operates to perform a stirring function.

Advantageous Effects of Invention

As described above, according to a gas hydrate reactor having a scraper, in such a manner that the scraper which is rotationally driven about a center axis of the reactor is closed to the inner surface of the reactor, it is possible to prevent attaching of materials hindering a heat transfer on the inner wall surface of the reactor through a process of raking out gas hydrate particles. Also, efficiency for gas hydrate production becomes higher by promoting a stirring operation of water and gas received within the reactor.

BRIEF DESCRIPTION OF DRAWINGS

FIG. 6 is a graph showing a temperature change and a production rate of hydrate when the hydrate is deposited on an inner surface of an existing reactor body in a prior art.

FIG. 7 is a graph showing a temperature change and a production rate of hydrate when the scraper is incorporated according to an embodiment of the present invention.

BEST MODE FOR CARRYING OUT THE INVENTION

Figure 1:
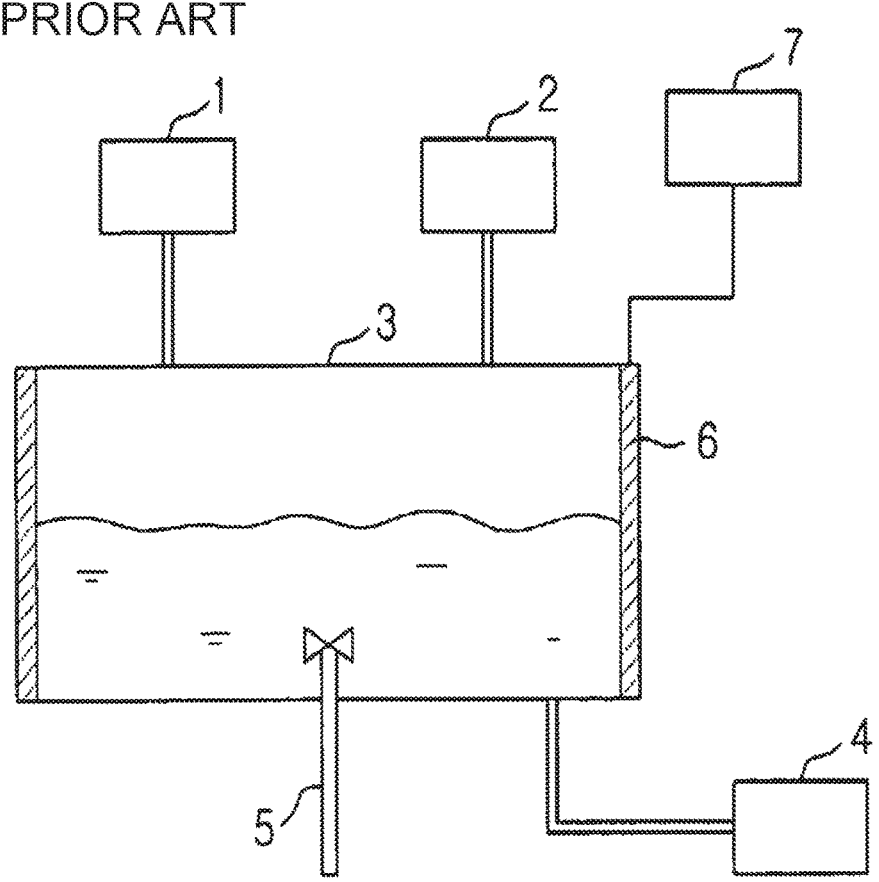
FIG. 1 is a schematic diagram of a typical gas hydrate producing apparatus according to a prior art.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Water treatment method utilizing a plurality of guest gases according to an embodiment of a present invention will now be explained in detail in connection with the accompanying drawings.

Hereinafter, the term 'gas' means a guest gas of a gas hydrate, while the term 'water' means a host molecule. In a generation of the gas hydrate, molecules which can be referred to as the guest gas include, for example, $CH_4$, $C_2H_6$, $C_3H_8$, $CO_2$, $H_2$, $SF_6$ and the guest gas and water ($H_2O$) are referred to as the gas and the host molecule, respectively.

Construction of a Gas Hydrate Reactor Having a Scraper

Figure 2:
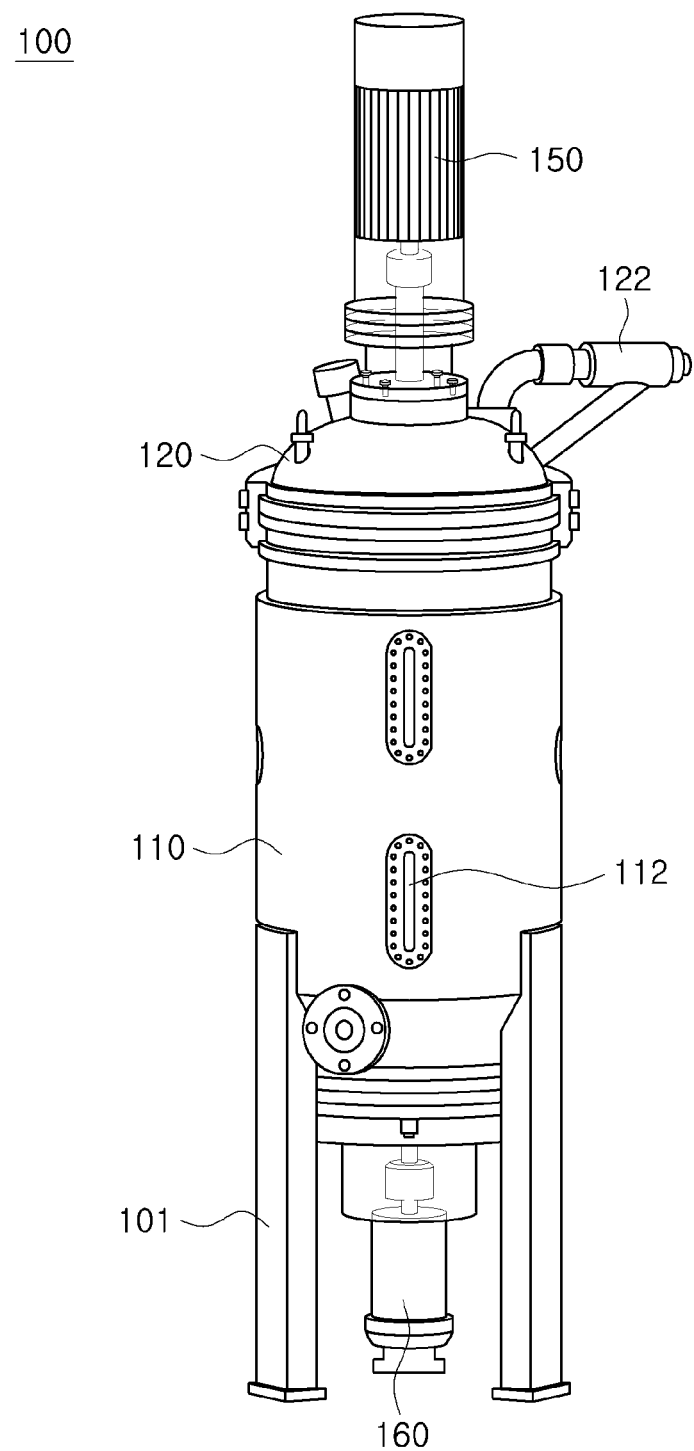
FIG. 2 is a perspective view of a typical gas hydrate producing apparatus according to a prior art.
Figure 3:
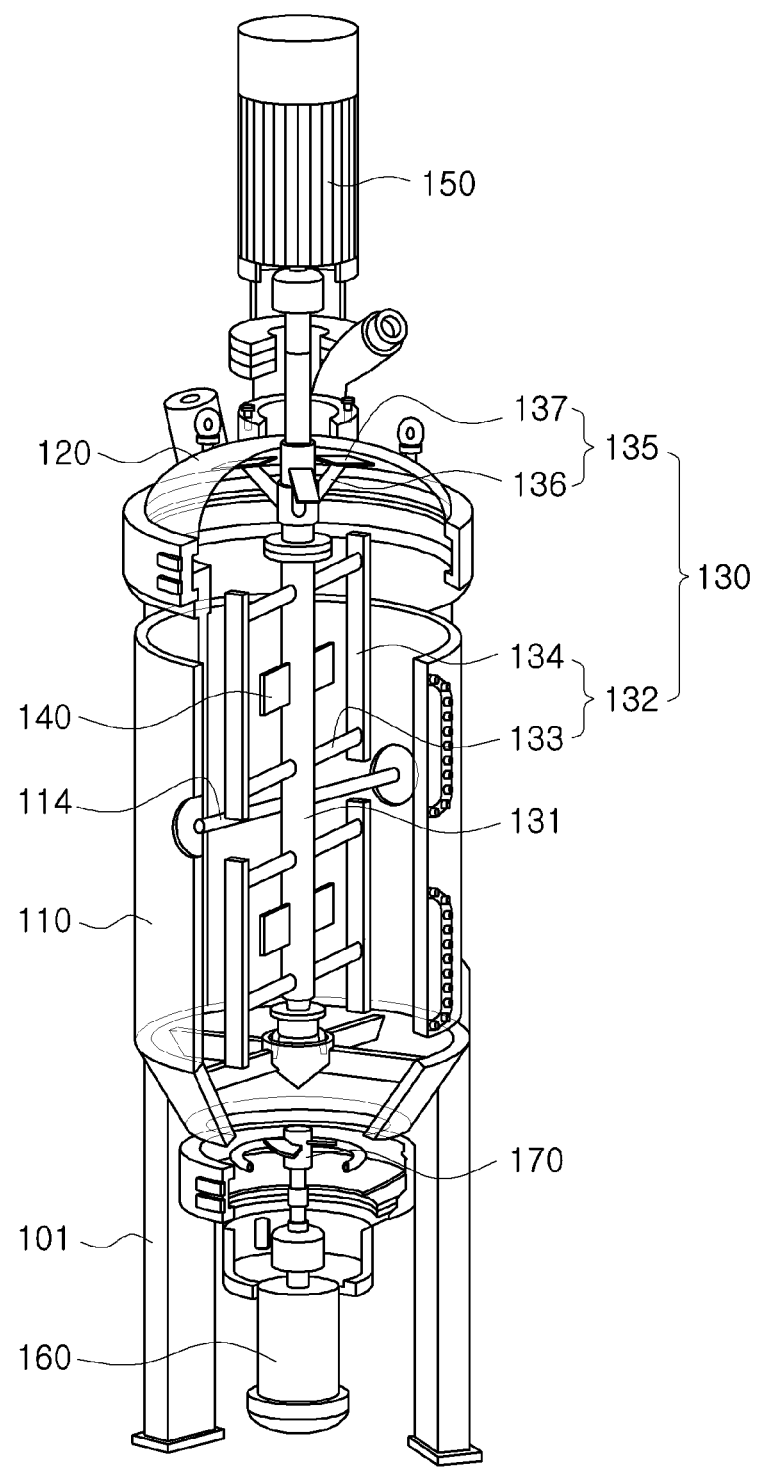
FIG. 3 is an exploded perspective view of a scraper arranged at the inside of a reactor according to an embodiment of the present invention.
Figure 4:
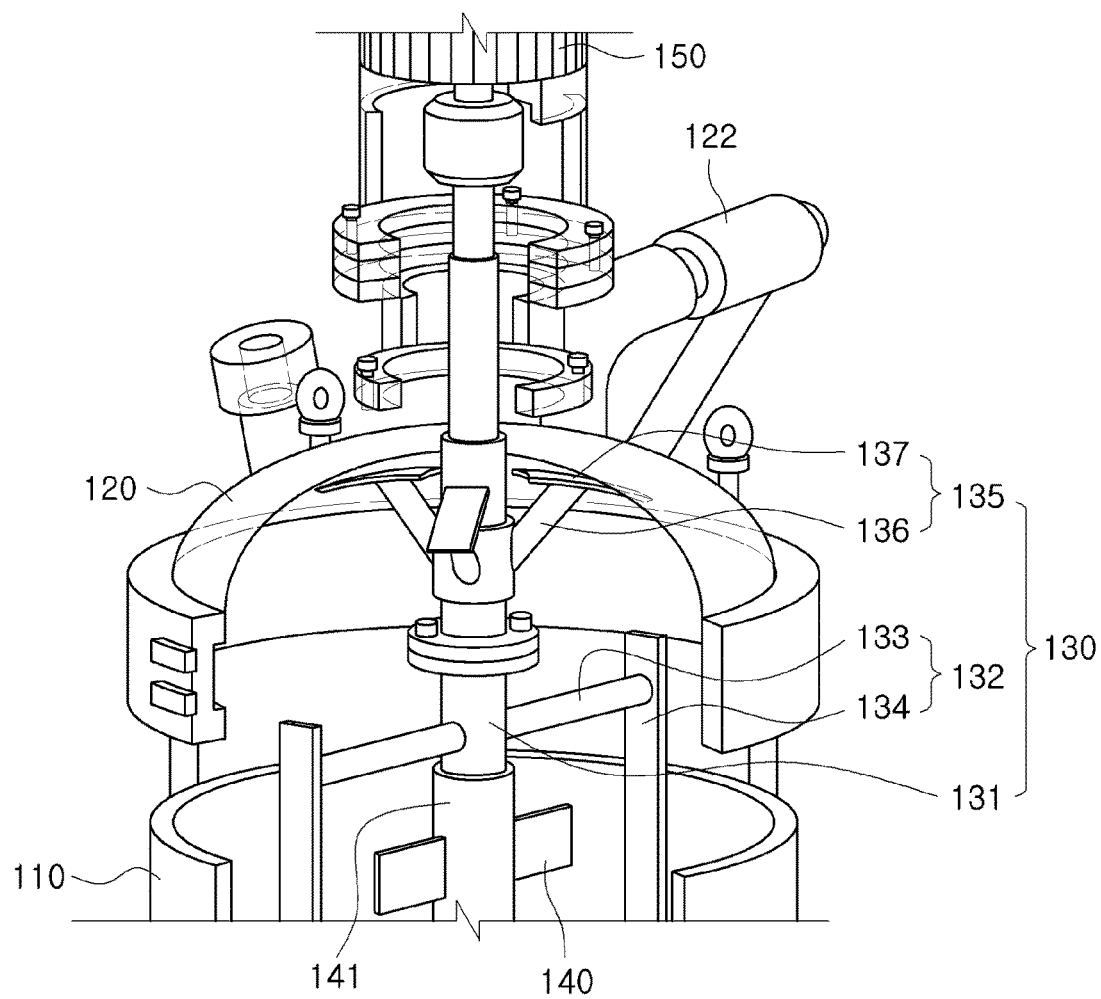
FIG. 4 is a partly enlarged view of FIG. 3, showing an upper structure of the scraper in detail.
Figure 5:
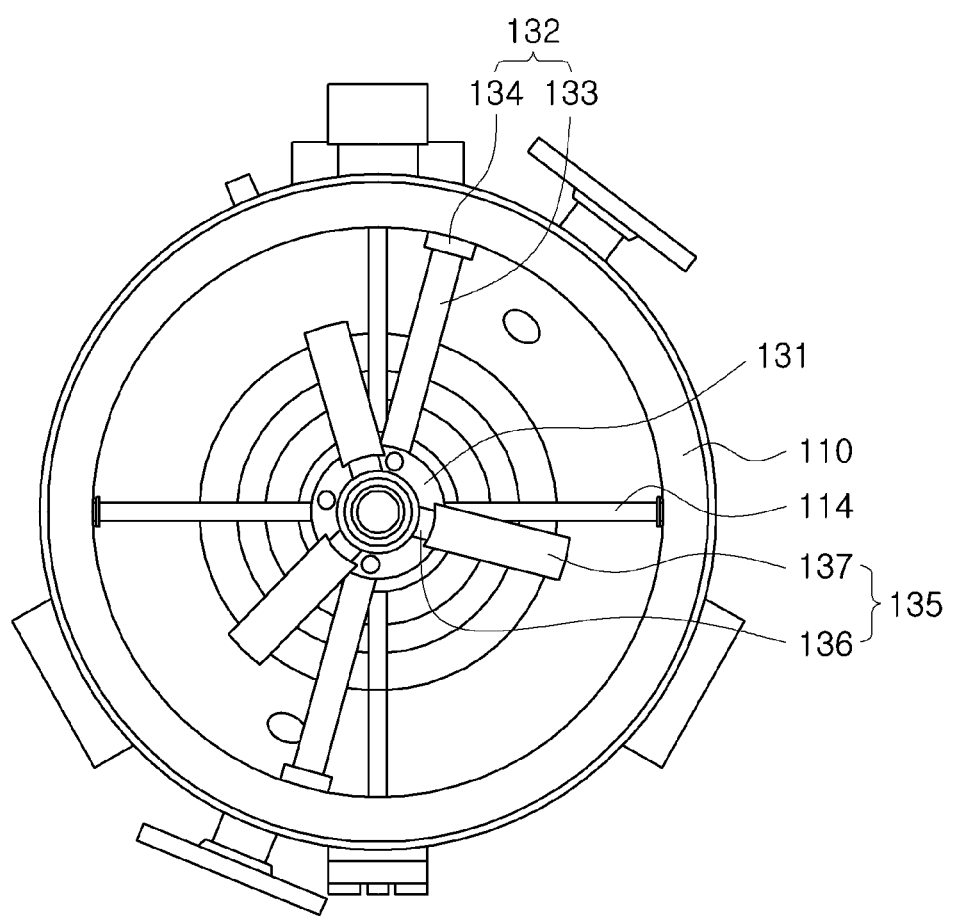
FIG. 5 is a top plan view showing the inside of the reactor.

Firstly, the gas hydrate reactor having a scraper according to an embodiment of a present invention will be described in connection with FIGS. 1 to 5.

The gas hydrate reactor 100, according to the present invention, includes a supplying source, a temperature sensor and a pressure sensor which are provided on the reactor, the supplying source and a tank, respectively, which are connected to a controller so that these can be controlled, but the description of elements such as the supplying source, the tank, sensors and the controller will be omitted, for simplification.

Likewise, a control unit to input operation parameters by user and to control an operation of the gas hydrate reactor 100 may be connected to the controller, but the description of these elements will also be omitted, for simplification.

Also, the gas hydrate reactor 100 according to an embodiment of a present invention is shown in the drawings, but it is to be understood that there is no intention to limit the invention to the forms such as a position, an arrangement, or a connecting method in the respective constructing elements.

The gas hydrate reactor 100 comprises a cylinder-shaped reactor body 110, an upper cover 120 which is engaged to an upper portion of the reactor body so that it can be opened and closed, a scraper 130 which is rotationally driven about a center axis of the reactor body 110, a stirring apparatus 140 configured to be driven under a condition forming the same center of rotation as the scraper 130, a scraper driving motor for providing a driving force, and a propeller driving motor 160 for providing a driving force to a propeller structure 170 disposed on a lower portion of the reactor body 110. Here, the reactor body 110 has a support 101 disposed on the lower portion of the reactor body 110 at a predetermined distance so that the support 101 can be stably positioned on the ground.

In the gas hydrate reactor 100, water and gas are supplied from an external supplying source (not shown) into the reactor body 110, and then the gas hydrate is created by an reaction between the water and the gas, by a rotational driving of the scraper 130 and the propeller structure 170. A gas hydrate slurry created at the reactor body 110 is discharged from the gas hydrate reactor 100 through a slurry outlet 122 connected to the upper cover 120, and the discharged gas hydrate slurry is palletized by way of, for example, a dewatering process, a cleaning process, a compression process, etc. or a dissociation process, for example, may be added, so that a desalination process can be performed.

It is possible to use the reactor body 110 not only as a reactor that the water and the gas react to each other, but as a dehydrator and a storage tank. That is, after the gas hydrate is formed, dewatering and storage processes may be separately performed or may be implemented by a single process so that a number of processes can be implemented in a single space.

The upper cover 120, having a lid-type open/close construction, has one side which is coupled with an upper part of the reactor body 110 by a clamping operation to facilitate an open/close operation of the reactor body 110.

The scraper 130 includes a rotating axis 131 disposed on a center axis of the reactor body 110, a first scraper 132 for removing the gas hydrate particles attached to an inner surface of the reactor body in such a manner that it is connected to the rotating axis 131, and a second scraper for removing the gas hydrate particles attached to an inner surface of the upper cover 120 in such a manner that it is connected to an upper portion of the rotating axis 131. The first scraper 132 consists of a plurality of components that can be arranged in a line at predetermined intervals.

The first scraper 132 is equipped with a first blade 134 for sliding along the inner peripheral surface of the reactor body 110, and a first connecting bar 133 for connecting the rotating axis 131 to the first blade 134. Likewise, the second scraper 135 is equipped with a second blade 137 for sliding along an inner peripheral surface of the upper cover 120, and a second connecting bar 136 for connecting the rotating axis 131 to the second blade 137. Here, these connecting bars 133 and 136 also function to help a mixing of materials within the reactor body 110 through a predetermined rotation process.

The first blade 134 is preferably designed to have a predetermined radius of curvature so that it is close to the inner surface of the reactor body 110. Similarly, the second blade 137 is preferably designed to have a predetermined radius of curvature so that it is close to the inner surface of the upper cover 120.

A stirring apparatus or agitator 140 can be extended circumferentially to a speed reducer 141 coupled to surround the rotating axis 131. The stirring apparatus 140 is rotationally driven about the rotating axis 131 which is actuated by a scraper driving motor 150, in which the speed reducer 141 controls a rotational speed of the rotating axis 131 and sends it to the stirring apparatus 140, so that the rotational speed of the stirring apparatus 140 can be maintained at a low speed, compared to the rotational speed of the scraper 130.

When a propeller structure 170 is disposed on the lower portion of the reactor body 110, it is possible to supply the water and the gas entering the reactor body 110 in such a manner that the water and the gas are properly mixed. That is, a separate propeller driving motor 160 provides rotary power to the propeller structure 170 so that reacting materials supplied from a lower portion of the reactor body 110 can be quickly diffused at a faster speed.

As mentioned above, according to the present invention, the scraper 130 and the stirring apparatus 140 may be operated simultaneously by a rotary driving or may be rotated at a speed different to each other by the speed reducer 141. Thus, the scraper 130 is capable of removing the gas hydrate particles which may be attached to the inner surface of the reactor 100 while performing effectively a stirring action of the water and the gas which are received in the reactor 10, so that an environment for promoting the gas hydrate forming reaction can be established.

It is thus apparent that a system using the scraper according to the present invention is definitely superior to the prior art by enhancing the production rate of the hydrate, and the reason will be described.

FIG. 6 illustrates that the gas hydrate is deposited within the reactor body with a thickness of about 5 mm, and FIG. 7 illustrates that the gas hydrate is not deposited within the reactor body by incorporating the scraper according to the present invention In view of a cooling efficiency, in the case of FIG. 6 showing that the gas hydrate is deposited in a thickness of about 5 mm, there is no substantial difference between an inlet temperature and an outlet temperature of a cooling water due to lowering of the cooling efficiency, but, in the case of FIG. 7 showing that the gas hydrate is not deposited, it is apparent that the outlet temperature of the cooling water is remarkably increased compared to the inlet temperature, so that a thermal transfer through a wall surface of the reactor body can be actively performed. Moreover, in order to cause a reaction based upon the prior art, it is necessary to supply a cooling water having a much lower temperature than a condition shown in FIG. 7, but this would in turn cause an undesirable increase of the energy cost for cooling and the installation cost.

Also, in view of a reaction rate, in the case of FIG. 7 showing that the gas hydrate is effectively removed, it is apparent that a hydrate production rate is much greater than that shown in FIG. 6, depending upon lowering of a cooling water inlet temperature. Furthermore, also in the case of an inlet temperature condition of the same cooling water, it is observed that hydrate production rate is much greater than that shown in FIG. 6.

Operation of Gas Hydrate Reactor Having Scraper

Hereinafter, an operation of the gas hydrate reactor 100 having a scraper will be explained in connection with FIGS. 1 to 5.

Firstly, water and gas are supplied through the lower portion of the reactor body.

The supplied water and gas are distributed and diffused by a rotating operation of the propeller structure 170 which is activated by the propeller driving motor 160, and is moved towards the upper portion in the reactor body 110.

Particles, attached to the inner surface of the reactor body 110, of gas hydrate slurries produced according to the reaction between water and gas, can be removed by a rotation operation of the scraper 130 which is activated by the scraper driving motor 170. That is, the first blade 134 of the first scraper 132 is slid along the inner peripheral surface of the reactor body 110, so that the attached particles can be separated and removed. Similarly, the second blade 137 of the second scraper 135 is slid along the inner peripheral surface of the upper cover 120, so that the attached particles can be separated and removed.

Meanwhile, a temperature of the reactor body 110 can be measured in real-time by a thermometer 114, which is controlled by a controller (not shown), installed within the reactor body 110, and thus it is possible to check whether or not the temperature is in the range of a proper condition for a production of gas hydrate.

A see-through window 112 which is provided within the reactor body 110 is oval in shape, through which it is possible to view with the eye as to whether or not the reaction during the gas hydrate production process is properly implemented.

When the scraper 130 is rotationally driven, the stirring apparatus 140 which is rotationally driven about the rotating axis 131, identically with the scraper 130, can be controlled in view of the speed ratio through the speed reducer 141 to be driven at a speed different from the scraper 130. That is, the stirring apparatus 140 is rotationally driven about the rotating axis 131 which is actuated by the scraper driving motor 150, in which the speed reducer 141 controls a rotational speed of the rotating axis 131 and sends it to the agitator 140, so that the rotating speed of the speed reducer 141 can be maintained at a low speed, compared to the rotational speed of the scraper 130.

The gas hydrate slurry produced in the reactor body is discharged from the reactor 100 through the outlet 122 coupled with the upper cover 120, and then it can be processed by, for example, palletizing or desalination work, etc. by way of the processes such as dewatering, compression, cleaning, etc.

As mentioned above, according to the gas hydrate reactor having a scraper of the invention, it is possible to remove the gas hydrate particles attachable on the reactor body and the inner surface of the upper cover, by means of the scraper which is rotationally driven about the center axis of the reactor body to which water and gas are supplied from the external supplying source, causing an undesirable production of the gas hydrate. Thus, according to the present invention, since the gas hydrate particles formed in the reactor are not attached on its inner surface, it is possible to prevent lowering of heat transfer through a wall surface of the reactor body.

While the present invention has been described with respect to the specific embodiments, it will be apparent to those skilled in the art that various changes and modifications may be made without departing from the spirit and scope of the invention as defined in the following claims.

The invention claimed is:

1. A method comprising:
supplying gas and water to a reactor body in which gas hydrates are created;
applying a driving force to rotate a scraper assembly which is arranged for rotation within the reactor body by using a scraper driving motor;
actuating a stirring apparatus at a different speed from a rotating speed of the scraper assembly by a speed reducer arranged to surround a rotating bar of the scraper assembly; and
removing gas hydrate particles attached onto an inner surface of the reactor body and an upper cover engaged to the reactor body, by a rotational movement of the scraper assembly relative to the inner surface of the reactor body and the upper cover,
wherein the scraper assembly operates to perform a stirring function,
wherein the stirring apparatus is actuated under a condition with the same center of rotation as the scraper, and
wherein the scraper assembly includes: the rotating bar; a first scraper for scraping the inner surface of the reactor body, the first scraper connected to the rotating bar; and a second scraper for scraping the inner surface of the upper cover, the second scraper connected to the rotating bar.

* * * * *